May 4, 1954          J. O. GAGE          2,677,509
FISHLINE HOLDER
Filed July 6, 1951          4 Sheets-Sheet 1
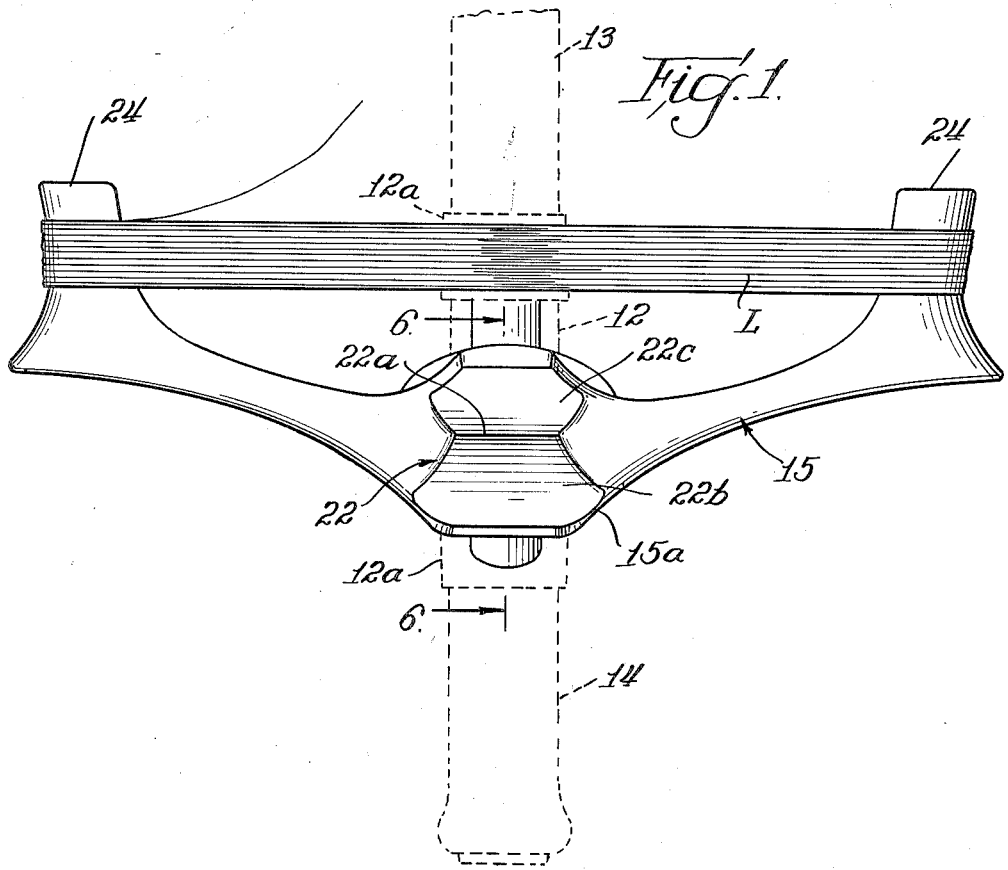
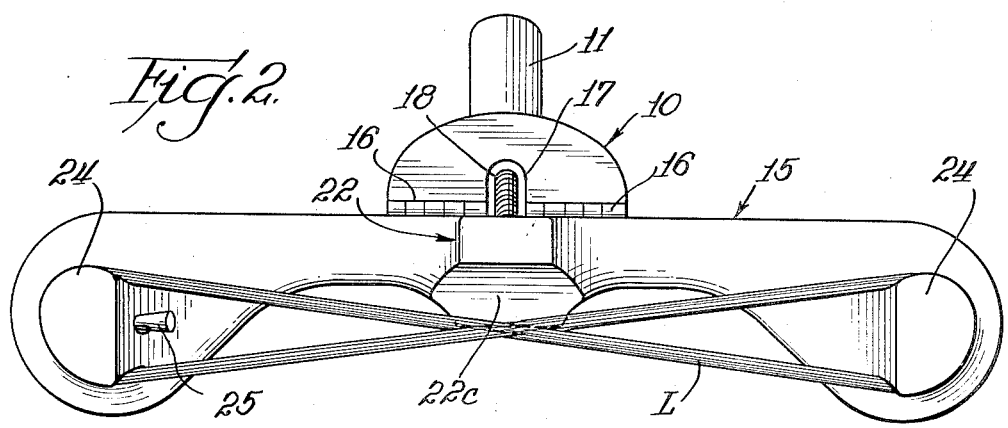
INVENTOR.
James O. Gage
BY
Atty.

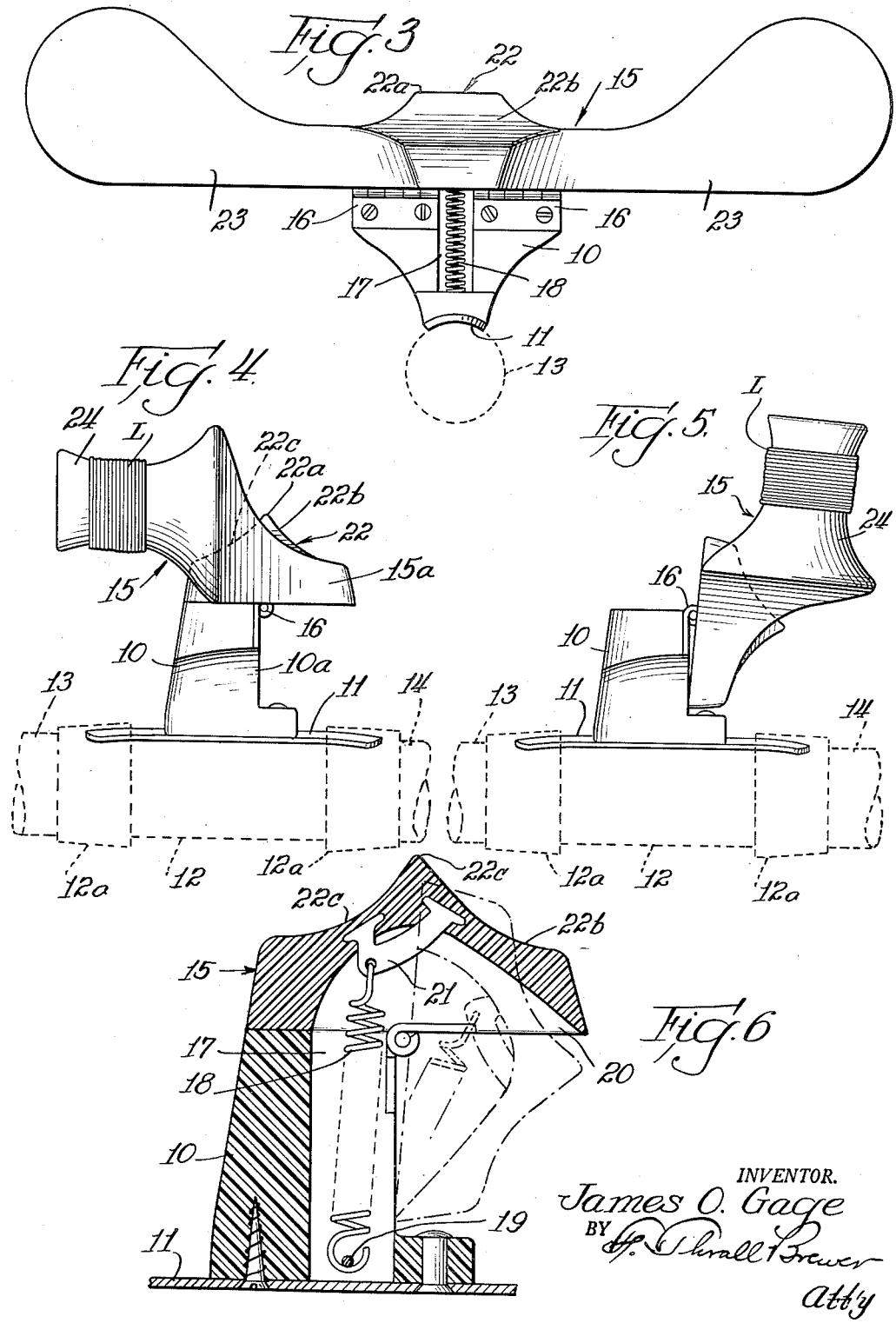

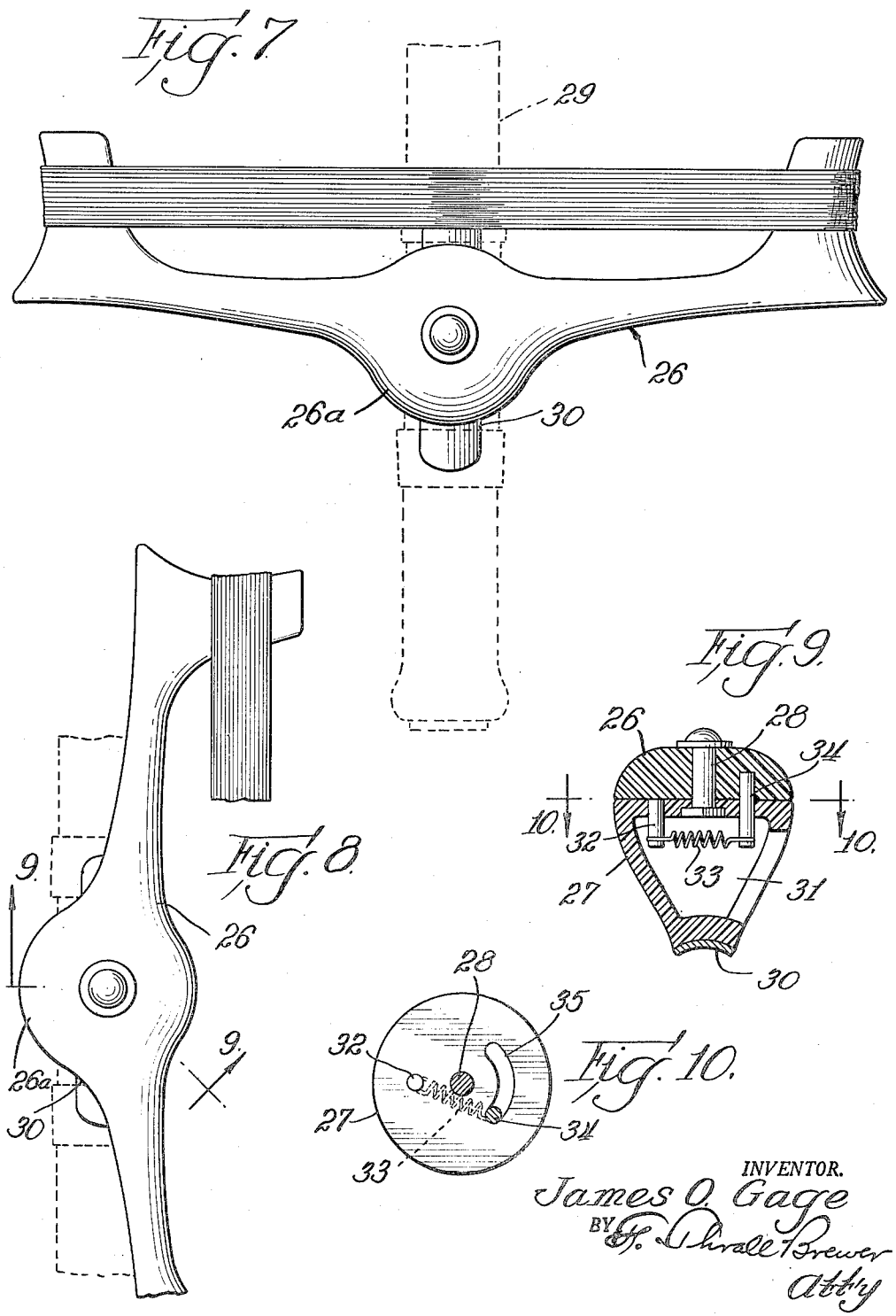

May 4, 1954  J. O. GAGE  2,677,509
FISHLINE HOLDER
Filed July 6, 1951  4 Sheets-Sheet 4
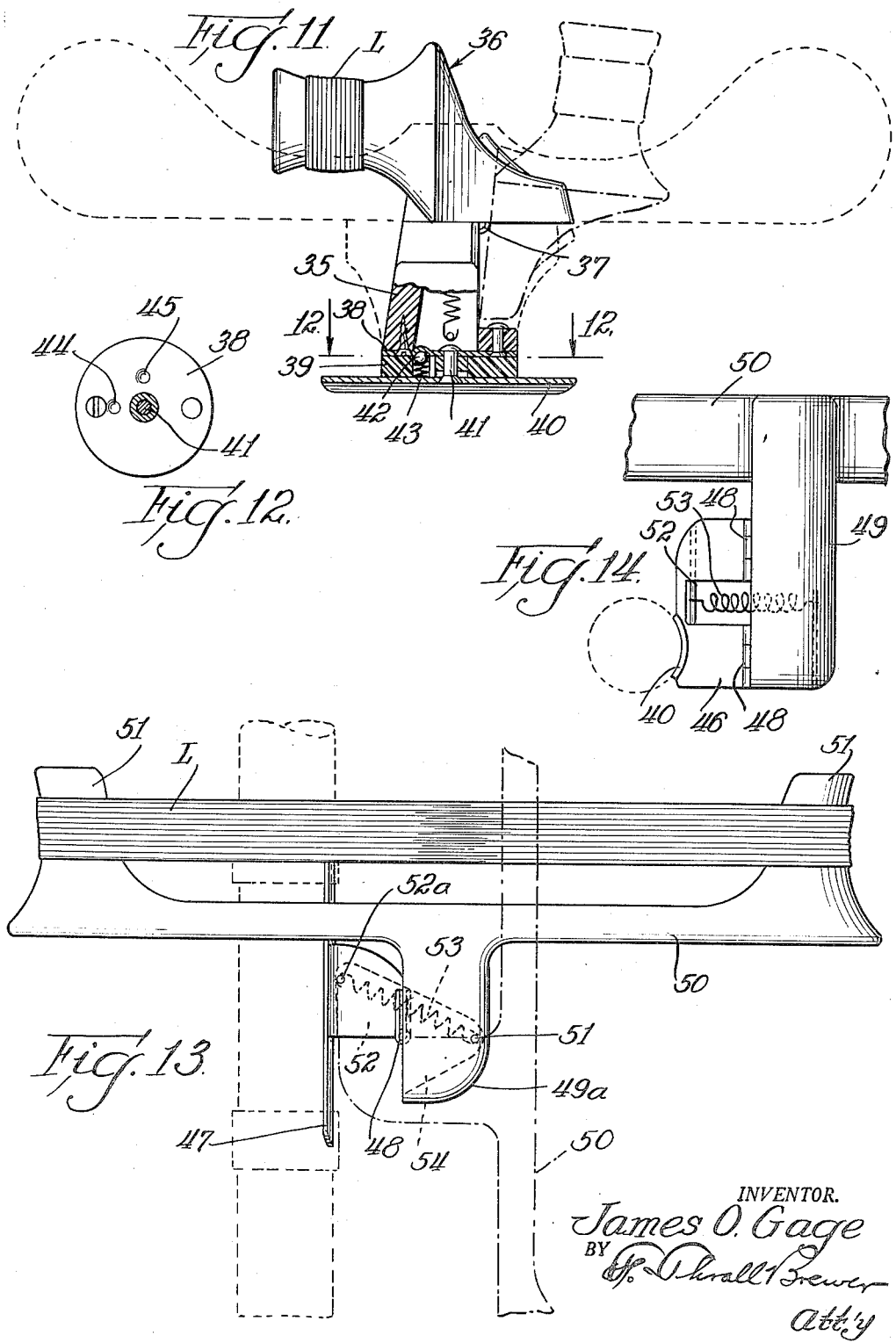
INVENTOR.
James O. Gage
BY
atty Patented May 4, 1954

2,677,509

UNITED STATES PATENT OFFICE 2,677,509

FISHLINE HOLDER

James O. Gage, Maquoketa, Iowa

Application July 6, 1951, Serial No. 235,510

5 Claims. (Cl. 242—84.1)

This invention relates to improvements in fish line holders.

Among bait casters for fish, the popularity of spinning reels has grown in recent years due probably to the fact that the available spinning reels make possible longer cases, better control, the use of lighter and more varied lures, and avoid the formation of backlashes. In the use of such reels in casting, the line is stripped in successive convolutions in an axial direction from an end of the reel spool without imparting rotation to the spool and hence forward movement of the lure is not impeded by drag on the line originating at the reel nor is "thumbing" necessary in avoiding backlashes since, with a stationary spool, the causative factor in the formation of backlashes is absent. However, as the line is stripped from a spool in successive convolutions in an axial direction, twisting of the line occurs which, when the condition becomes aggravated, causes annoyance to the fisherman and necessitates eventual correction, sometimes by stripping the line from the reel for untwisting.

It has heretofore been proposed to avoid the twisting of the line common to conventional spinning reels by providing line holders or carriers of non-rotatable form upon which the lines, during retrieving of cast lures, can be wound in figure eight form. Such proposed line holders have not, insofar as I am aware, been provided with means for positively arresting the outgo of line from the holder such as is desirable, for example, in snubbing a hooked fish or in setting the hook following a strike or in handling the rod in one hand, leaving the other momentarily free, for example, as may be desirable at times in trolling.

It is an object of the present invention to provide a line holder for use with casting rods, in lieu of conventional bait casting or spinning reels, which avoids backlashes incident to the use of the former, while avoiding cumulative twisting of the line with successive casts which is inherent in the manner of paying out line by the latter and which can be shifted quickly from a casting to a snubbing position and vice versa by simple movement of the thumb or a finger of the hand holding the rod, or by the other hand, or by other means, as may be incidentally convenient.

Another object of the invention is to provide a fishing line holder for use with casting rods which can be used with equal facility by a right or left-handed fisherman and which, instead of holding the line in compact helical convolutions exposes the wound up portions of the line to the air for drying.

An additional object of the invention is to provide a holder of the type mentioned which is of simple construction requiring no adjustment or lubrication and a minimum of maintenance and can be manufactured at relatively low cost; the major parts of which can be made of molded plastic, metal, wood or other material of light weight and of such color, colors, or finish as are not objectionable with respect to their light reflecting characteristics.

Other objects of the invention relate to various features of construction and arrangement of parts which will be apparent from a consideration of the following specification and accompanying drawings wherein several line holding structures are shown which are illustrative of the present invention.

In the drawings:

Figure 1 is a plan view of a line holder provided with a line carrier shown in a position to pay out line freely, the holder being shown mounted on a casting rod indicated fragmentarily by dotted lines;

Fig. 2 is a plan view of the holder with the line carrier element moved on a horizontal axis to a line snubbing position from the position shown in Fig. 1 and showing a line wound thereon;

Fig. 3 is a rear elevational view of the holder with the line carrier in the casting or line pay-out position shown in Fig. 1;

Fig. 4 is a side elevational view of the holder looking to the right in Fig. 1;

Fig. 5 is a side elevational view similar to Fig. 4 but showing the line element in the snubbing position shown in Fig. 2;

Fig. 6 is an enlarged sectional view taken on line 6—6 of Fig. 1;

Fig. 7 is a plan view of a line holder of modified structure wherein the line carrier is movable on a vertical axis to and from a casting or line pay-out position;

Fig. 8 is a plan view of the line carrier of Fig. 7 in a snubbing position relative to the fragmentarily illustrated rod;

Fig. 9 is a sectional view taken on line 9—9 of Fig. 8;

Fig. 10 is a sectional view taken on line 10—10 of Fig. 9;

Fig. 11 is an elevational view, partly in section, of a line holder which is a composite of the two forms shown in Figs. 1 to 6 and 7 to 10, the figure showing in full lines the line carrier extending transversely of the rod in a line pay-out position and showing in dot-dash lines the carrier in snubbing position, while in dotted lines the carrier is shown in rear elevation in line pay-out position, as after turning the carrier from the full-line position through an arc of 90° about a vertical axis;

Fig. 12 is a sectional view taken on line 12—12 of Fig. 11;

Fig. 13 illustrates in plan view an additional modified form of the improved line holder adapted for mounting on the side of the rod, rather than on the upper surface of the rod, the figure showing the carrier in line pay-out position in full lines and in snubbing position in broken lines; and Fig. 14 is an elevational view of the holder shown in Fig. 13, the line carrier being in the line pay-out position.

Referring to Figs. 1 to 6 of the drawing, the improved fish line holder is shown as comprising a base 10 secured to a mounting plate 11 of conventional form by means of which the holder can be removably attached to the reel seat portion 12 of a rod 13 by the conventional locking means, such as by a pair of rings 12a which are shown merely for illustrative purposes. The base 10, when secured to the reel seat, as shown in Fig. 1, is normally in upright position adjacent a conventional hand grip 14 of the rod. A line carrier element, indicated generally by the numeral 15 is secured to the base for movement on a horizontal axis disposed transversely of the longitudinal axis of the rod. The means for securing the carrier 15 to the base 10 in the disclosed structure comprises two hinges 16, 16, located on opposed sides of a cavity or recess 17 formed in the base for accommodating a tensioned helical spring 18. The spring (Fig. 6) is shown secured to a pin 19, or the like, adjacent the lower end of the recess 17 and extends into a complementary recess or cavity 20 provided in the carrier 15 where it is secured to an anchoring member 21 which may be anchored by suitable means, as by embedding the end portions thereof in the material of which the carrier is formed, if of a molded plastic, as preferred. The spring-accommodating cavities 17 and 20 are shown as open at the forward side of the line holder for convenience in assembly or of access to the parts therein when necessary.

The longitudinal axis of the spring, when the carrier element 15 is in the line pay-out position shown in Fig. 4, is so disposed that the spring tends to retain the carrier in that position, as illustrated in Fig. 6. However, when the carrier is tilted in a clockwise direction about the axis of the hinges, as viewed in Fig. 4, the spring will snap the carrier quickly to the position shown in Fig. 5, or the dotted line position of Fig. 6, as the upper end of the spring is swung by such tilting movement past an imaginary straight line passing through the pin 19 and the hinge axis. The spring tends to retain the carrier in either position to which it is moved. A similar quick snap-over action is imparted to the carrier also as it is moved past the imaginary line in the opposite direction; that is, in moving from the position shown in Fig. 5 to that of Fig. 4.

The upper end of the base 10 is flat and forms a stop which limits forward swinging movement of the carrier at the position shown in Fig. 4. The rear face 10a of the intermediate portion of the base 10 is flat, in the form illustrated in Figs. 1 to 6 and constitutes a stop which is contacted by a central protruding portion 15a of the carrier, when the carrier is in the upright or line-snubbing position shown in Fig. 5. The carrier thus has two definite positions, from one to the other of which it is movable by spring action when the carrier is moved by the fisherman past the center line position in which snap action originates, as above-described.

For convenience in moving the carrier readily from one of said positions to the other, the intermediate portion of the carrier is provided with a central thumb piece indicated generally by numeral 22 and comprising a rib 22a having similar slightly concave side walls 22b, 22c, as shown in Fig. 6. The concave walls are symmetrical or substantially so and when the holder is mounted on a rod the walls 22b, 22c are in positions for convenient access by the thumb or a finger of the hand gripping the rod for applying pressure to one side or the other of the pivotal axis of the carrier for flipping it quickly, with the aid of the spring, from the line pay-out position shown in Fig. 4 to the snubbing position shown in Fig. 5, or vice versa. In the snubbing position, line cannot be drawn from the carrier where the line passes through the line guides or the rod in the usual manner. For retaining the carrier in the snubbing position against the pull of a fish, or other drag of the line, the thumb of the user is applied to the curved surface 22c. Such thumb piece, indicated generally by numeral 22, may be made in various shapes, with or without ribs, and its surface may have a tread pattern thereon.

Extending laterally from the central thumb piece 22 are similar arms 23 each provided with one of a pair of line receiving spindles 24. The spindles preferably are formed integrally with the carrier 15 and hence are non-rotatable. The spindles have free outer ends and the longitudinal axes of the spindles may be substantially parallel as illustrated. The line indicated by the letter L is attached at the inner end to one of the spindles or the supporting arm by tying the same thereon or by passing the end of the line through an opening in the spindle and anchoring it therein by a tight-fitting plug 25, shown in Fig. 2. It may be secured to the spindle by other suitable means. The major portion of the line is wound around the spindles, preferably in a figure 8 manner, since cumulative twisting of the line by repeated casts and retrieves is thereby avoided. The free end of the line is threaded through the rod line guides (not shown) and is provided with the bait or lure in the usual manner when the line is in use.

As a cast is made, the carrier is in the line pay-out position shown in Figs. 1 and 4, that is, with the spindles 24 extending in a forward direction relative to the rod. A part of the line between the spindles 24 and first rod guide is preferably held between the thumb and thumb piece, for release with proper timing to effect the cast. The spindles, as shown, have concave line retaining surfaces which tend to cause the convolutions or turns of the line as it is wound about the spindles to nest centrally of the spindles but permit successive turns to slide over the ends of the spindles in freely paying out the line during the flight of the lure. The lack of any substantial drag on the line other than the weight of that portion which is moving outwardly at any instant enables casts to be made with less muscular effort than where a conventional bait casting reel is employed, and no backlashes occur. In retrieving the lure following a cast, the carrier may be flipped to the position of Fig. 5 and the hand not used in holding the rod is employed in retrieving the line and winding it upon the spindles.

With the spindles in the upright position shown in Fig. 5, the rewinding of the line is effected in a plane sufficiently removed from the rod as to avoid interference by the rod. Should a strike occur during the retrieving of the lure, the spindles are in snubbing position and enable the fisherman instantly to set the hook, the thumb of the rod-holding hand being upon the thumbpiece. If it is necessary to pay out line as a hooked fish runs, the carrier can be flipped quickly to the pay-out position of Fig. 4 and the amount of line payed out can be controlled and proper tension on the line can be applied by the other hand, as in the use of fly fishing tackle for example.

The provision of a pivotally mounted line carrier which can be moved readily to and from a snubbing position is of substantial advantage since, with the carrier in snubbing position, the hook can be set by a quick swing or flip of the rod by the hand supporting the rod. When a hooked fish is brought into a netting, gaffing or landing position, with the carrier in snubbing position, the other hand is free for the exigencies of the moment.

The principles of the above-described improvements can be utilized in structures differing in detail from the form of the line holder shown in Figs. 1 to 6, inclusive. For example, in Figs. 7 to 10, inclusive, a line holder is shown comprising a line carrier 26 generally similar to the carrier above-described but which is pivotally supported on a base 27 by means of a normally vertical pin 28 which enables the carrier to be swung from the line pay-out position, shown in Fig. 7, in which the carrier extends transversely of a rod 29, to a snubbing position in which the carrier is generally parallel with the rod, as shown in Fig. 8. The base 27 is provided with a mounting plate 30 of usual form for securement to a reel seat of a rod and is provided with a cavity or recess 31 accommodating a fixed stud 32 secured to the wall of the base and to which one end of a tensioned spring 33 is attached. The other end of the spring is attached to a stud 34 which extends through an arcuate slot 35 in the upper wall of the base and is anchored in the carrier in a position eccentric with respect to the pivot pin 28. The length of the slot is such as to afford swinging movement of the carrier about the pin 28 as an axis through an arc of 90°. By manual movement of the carrier in a clockwise direction, as viewed in Fig. 7, to move the stud 34 past an imaginary line through the pivot pin 28 and fixed stud 32, the tensioned spring will complete the movement of the carrier to the snubbing position shown in Fig. 8. Reverse movement of the line carrier 26 will be accompanied by snap action as will be apparent.

The line holder shown in Figs. 7 to 10, inclusive, is adapted to be mounted on the upper surface of the rod adjacent the handle or hand grip thereof in a position wherein the shifting movement of the carrier can be effected by the thumb or a finger of the hand gripping the rod. The rear central portion 26a of the carrier provides a finger piece to which pressure may be applied on either side of the pivotal axis for initiating the described snap action of the carrier from either described position to the other.

The form of the invention shown in Figs. 11 and 12 constitutes generally a composite of the forms shown in the preceding figures of the drawing. In this form of the invention, the base 35 of the line holder corresponds to the base 10 of the form shown in Figs. 1 to 6, inclusive, and is provided with a line carrier 36 corresponding to the carrier 15 of the form shown in Figs. 1 to 6, inclusive. The carrier 36 is attached by hinges 37 to the base 35 to enable the carrier to be tilted about the axis of the hinge in the manner above-described with respect to the first-described form of the invention. Other portions of the line carrier shown in Fig. 11 correspond to the parts of the carrier shown in Figs. 1 to 6 inclusive and further description thereof is believed unnecessary.

The base 35 of the form shown in Fig. 11 is secured to a base plate 38 which is mounted on a sub-base 39, which, in turn, is secured by screws to a conventional reel mounting plate 40. The sub-base 39 is pivotally connected to the plate 38 by means of a pin or rivet 41 or the like which enables the base 35 to be turned about the vertical axis defined by the pin 41. Within a vertical recess in the sub-base 39 is a ball catch 42, comprising a ball which is pressed upwardly by a spring 43, as shown in Fig. 11. The ball is adapted to seat in recesses or sockets 44 and 45 formed in the plate 38 when the base 35 is in one of two extreme positions of adjustment. In the position of the base shown in Fig. 11, the ball 42 engages the socket 44 and tends to retain it in such position. By manual operation of the carrier 36 about the axis of the pin 41, the base 35 can be rotated through an arc of 90° in which position the ball will seat in the socket 45.

With the base 35 in the position shown by full lines in Fig. 11, it will be seen that the line carrier 36 may be tilted about the axis of the hinges 37 by a thumb action of the fisherman from the line pay-out position to the snubbing position indicated by dot-dash lines. However, if the user so desires, he may with the carrier in the position shown in full lines move the carrier 36 and base 35 about a vertical axis defined by the pivot 41 to swing the carrier to the dash line position shown in Fig. 11 in the same manner as the carrier shown in Fig. 7 can be swung to the position shown in Fig. 8, that is, to a position where the line carrier is arranged substantially parallel with the rod which is a snubbing position. In the structure shown in Fig. 11 the user has the option of swinging the carrier about a horizontal axis as in Fig. 1 or about a vertical axis as in Fig. 7 for example.

The line holder shown in Figs. 13 and 14 is adapted to be mounted, not on the upper surface of the rod, but at the side of the rod adjacent the hand grip, as shown clearly in Fig. 13. In this form of the invention, the holder comprises a base member 46 provided with a mounting plate 47 of conventional form and pivotally connected as by means of spaced apart hinges 48 and 48 to a central standard 49 of a line carrier 50 which is provided with line carrying spindles 51 preferably of the shape above-described in conjunction with the carrier shown in Figs. 1 to 6, inclusive. The standard 49 and the line carrier 50 preferably are integrally formed as of molded plastic. As shown in Figs. 13 and 14, in the normal position of the holder, the axis of the hinges is vertical. The line carrier 50 can be swung about the pivotal axis to and from the dotted line position shown in Fig. 13 which constitutes the snubbing position in which the spindles 51 extend laterally of the longitudinal axis of the rod, while the full line position shown in said figure constitutes the line pay-out position in which the spindles extend in a forward direction and thus enable successive turns of the line to be stripped freely therefrom, as in casting. For the purpose of providing a quick snap-over arrangement which not only tends to hold the line carrier in either of the two positions mentioned, but facilitates positive movement of the carrier from either of said positions to the other, the base 46 is provided with a recess 52, within which recess there is a pin or other suitable means 52a to which is anchored one of a tensioned spring 53. The spring extends into another complementary recess 54 formed in the standard 49, wherein the other end of the spring is secured to a pin 55 or the like. As will be noted in Fig. 14, the recesses mentioned are disposed between the spaced apart hinge members 48 and 48. The arrangement described provides a quick snap-over arrangement for the carrier which can readily be flipped by thumb action from either of the positions shown in Fig. 13 to the other. The standard 49, particularly the surface portions 49a, constitutes a finger piece to which pressure can be applied by a thumb or finger at appropriate positions with respect to the hinge axis for initiating the snap-over movement of the carrier in flipping from the line pay-out position to the snubbing position or vice versa.

In each form of the line holder above-described, the spindles of the carrier element project in a forward direction when the carrier is in a line pay-out position, the carrier being then disposed substantially at right angles to the longitudinal axis of the rod and the spindles being disposed on opposed sides of the rod axis whereby the convolutions or turns of wound-up line can be stripped freely from the spindles alternately by the outwardly moving portion of the line along the rod. In all the forms of the holder described above, the spindles of the carriers, when in snubbing position, are so disposed with respect to the rod that the latter does not interfere with the freedom of movement of the hand in winding the line upon the spindles. For example, in the form shown in Figs. 1 to 6, the spindles project upwardly when the carrier is in snubbing position. In the form of the invention shown in Figs. 11 and 12, the spindles may project upwardly or laterally, while in the form shown in Figs. 7 to 10 and 13 and 14, the spindles project laterally, thus enabling the hand grasping the portion of the line between the holder and the first line guide on the rod to move freely in winding up the line without interference by the adjacent portion of the rod. If desired, a line holder base can be attached to a side of the rod as in Figure 13 and a carrier pivotally attached to the base for movement between a line pay-out position and a line snubbing position about a horizontal axis. With such arrangement the spindles will extend forwardly when in the line pay-out position and will project upwardly when in the snubbing position.

It will be seen that the form of the holder shown in Figs. 1 to 6 can be used by right- and left-handed fishermen with equal facility in snubbing, retrieving and rewinding the line. The same is true as to the form shown in Figs. 11 and 12, when the line carrier is flipped to snubbing position about a horizontal axis. As to each of the other illustrated forms of holders where movement of the line carrier from the line pay-out position to line snubbing position occurs on a vertical axis, the use of the holders by right- or left-hand casters is feasible without shifting the rod from one hand to the other since the rod can readily be rotated through an arc of 90° to move the laterally directed spindles into snubbing position to an upwardly directed position for the purpose of rendering the rewinding of the line on the spindles more convenient when the particular holder is in use by one who prefers to retain his grip on the rod with the same hand used in casting and to take in and rewind the line with his other hand. In the manufacture of holders of the type last referred to, the same may, if so desired, be so made that the line carriers will be moved about a vertical axis in a counter-clockwise direction to snubbing position rather than in a clockwise direction, such as illustrated in Figs. 7-14, inclusive. It will also be obvious that the side mounted form of holder shown in Figs. 13 and 14 may be made for mounting on the left-hand side of the rod, if desired. In all the forms of the invention illustrated, it will be seen that the outgoing or active portion between the lure and line holder of the line acts on successive turns or convolutions of the wound up line on the spindles in the general direction of the longitudinal axes of the spindles when the latter are in line pay-out position whereby line will be freely stripped from the spindles. When the spindles are in snubbing positions, however, the pull exerted on the wound up portions of the line on the spindles is in a direction substantially at right angles to the spindle axes and hence further outward movement of the active portion of the line is arrested or snubbed.

While use of the illustrated forms of line holders has been described generally in connection with the art of bait casting, it will be observed that the holders may be used with advantage in fly casting also. The several forms of the invention above-described are illustrative rather than limitative of the invention as it will be apparent that various changes in the details thereof may be resorted to without departure from the spirit of the invention defined by the appended claims.

I claim:
1. A fish line holder for use on a fishing rod comprising a line carrier provided with a pair of spaced apart spindles projecting in substantially parallel relationship from opposite end portions of oppositely projecting supporting arms, said spindles having free outer ends remote from the arms and intermediate portions about which a fishing line is adapted to be wound in successive turns, a base member having a part adapted to be attached to the rod adjacent the hand grip thereof, means pivotally securing the line carrier to the base member for movement relative to the base member between a line pay-out position in which the spindles are directed substantially parallel with the direction of movement of the line along the rod and a line snubbing position in which the spindles are directed substantially at right angles to the direction of movement of line along the rod, said base member and line carrier having positively engageable parts thereon for limiting movements of the line carrier to those back and forth between said positions relative to the base, and a tension spring having an action line movable across the axis of said means pivotally securing the line carrier to the base for resisting movement of the carrier from either of said positions and acting on the carrier to move the same quickly during the latter portion of the movement thereof to either of said positions from the other.

2. A fish line holder for use with a fishing rod comprising a base member adapted to be attached to a reel seat of a rod, a line carrier provided with a pair of spaced apart line spindles projecting from one face of the carrier and around which a fishing line is adapted to be wound, means pivotally securing said carrier to said base for movement through an arc of approximately 90° from a line pay-out position wherein said spindles project in a forward direction relative to a rod on which the holder is mounted to a line snubbing position wherein the spindles are disposed transversely of the rod, and a thumb piece having adjacent and angularly related surface portions extending to opposed sides of the pivotal axis at the mid-portion of the carrier for receiving selective applications of manual pressure to effect movements of the carrier pivotally from one of said positions to the other.

3. A fish line holder for use with a fishing rod comprising a base member adapted to be attached to the reel seat of a rod, a line carrier provided with a pair of spaced apart line spindles projecting from one face of the carrier and around which a fishing line is adapted to be wound, means pivotally securing said carrier to said base for movement through an arc of approximately 90° from a line pay-out position wherein said spindles project in a forward direction relative to the rod on which the holder is mounted to a line snubbing position wherein the spindles are disposed transversely of the rod, a thumb piece extending to opposed sides of the pivotal axis of the carrier for application of pressure manually on the carrier in positions for quickly moving the carrier pivotally from one of said positions to the other, and a tensioned spring connected to the base and carrier and having an action line which crosses said pivotal axis during movements of the carrier to said positions, so as to resist initial pivotal movement of the carrier from each of said positions and effecting snap movement of the carrier to the other position in each direction of movement.

4. A fish line holder for use on a fishing rod comprising a line carrier provided with a pair of spaced apart spindles projecting from opposite ends of corresponding faces of oppositely projecting supporting arms, said spindles having free outer ends remote from the arms and intermediate portions about which a fishing line is adapted to be wound in successive turns, a base member adapted to be attached to the rod adjacent the hand grip thereof, means pivotally securing the line carrier to the base for movement relative to the base member between a line pay-out position in which the spindles are directed substantially parallel with the direction of movement of the line along the rod and a line snubbing position in which the spindles are directed substantially at right angles to the direction of movement of the line along the rod, and means acting between the base and the line carrier and exerting a substantially continuous force to bias the line carrier toward one of said positions or the other dependent upon the relative positions of the base member and line carrier, and thereby effecting movements of the carrier with snap action from one position thereof to the other upon manual initiation of such movements from either of said positions to the other.

5. A fish line holder for use on fishing rods comprising a base adapted to be attached to a rod, a line carrier provided with spindles adjacent the ends thereof and projecting from the carrier in the same direction and having free outer ends and concave intermediate portions about which fish line is adapted to be wound, means pivotally connecting the carrier intermediately to the base for pivotal movement with respect thereto between a line pay-out position and a line snubbing position, and a spring connected to the base and carrier at positions so related to the axis of said means pivotally connecting the carrier to the base that it resists manual actuation of the carrier from each of said positions to the other throughout substantially the first half of said pivotal movement and effects acceleration thereto throughout substantially the last half of each such pivotal movement from one position to the other.

References Cited in the file of this patent

UNITED STATES PATENTS

| Number | Name | Date |
|---|---|---|
| 2,138,299 | Gruebel | Nov. 29, 1938 |
| 2,397,955 | Fowler | Apr. 9, 1946 |

FOREIGN PATENTS

| Number | Country | Date |
|---|---|---|
| 29,708 of 1912 | Great Britain | Jan. 16, 1913 |
| 585,959 | France | Dec. 19, 1924 |
| 203,892 | Switzerland | July 1, 1939 |